United States Patent [19]
Briancon et al.

[11] Patent Number: 5,905,448
[45] Date of Patent: May 18, 1999

[54] MULTIPART ANALOG MESSAGE AND A RESPONSE IN A COMMUNICATION SYSTEM

[75] Inventors: Alain Charles Briancon, McKinney; Leonard G. DeBarros, Azle; Mario A. Rivas, Southlake; Richard L. Bennett, Southlake; John T. Puma, Southlake, all of Tex.

[73] Assignee: Motorola, Inc., Schaumburg, Ill.

[21] Appl. No.: 08/775,900

[22] Filed: Jan. 2, 1997

[51] Int. Cl.⁶ .................................................. H04Q 7/14
[52] U.S. Cl. .................................. 340/825.44; 340/311.1; 340/825.48; 455/31.3
[58] Field of Search ...................... 340/825.44, 825.47, 340/825.48, 825.54, 825.08, 311.1; 379/67; 455/31.3, 38.2, 38.5, 458; 370/313, 314

[56] References Cited

U.S. PATENT DOCUMENTS

| | | | |
|---|---|---|---|
| 4,721,955 | 1/1988 | Dunkerton et al. | 340/825.47 |
| 4,875,038 | 10/1989 | Siwiak et al. | 340/825.44 |
| 5,128,665 | 7/1992 | DeLuca et al. | 340/825.47 |
| 5,153,582 | 10/1992 | Davis | 340/825.44 |
| 5,168,493 | 12/1992 | Nelson et al. | |
| 5,239,306 | 8/1993 | Siwiak et al. | 340/825.44 |
| 5,530,950 | 6/1996 | Medan et al. | 379/67 |

*Primary Examiner*—Edwin C. Holloway, III
*Attorney, Agent, or Firm*—James A. Lamb

[57] ABSTRACT

A communication system in which a multipart analog message (480) is generated by a controller (112) by including an analog part delimiter (440) between successive independent analog parts (420, 431, 432, 433). The multipart analog message (480) is positioned within a synchronous protocol, in which a digital code is included to identify the position of the multipart analog message (480). The synchronous protocol is transmitted by a radio transmitter (202) and received by a selective call receiver (122). The selective call receiver (122) digitally decodes the position of the multipart analog message (480) and begins recovery of the multipart analog message (480) at the position. The selective call receiver (122) recovers the part delimiters (440) and uses them to identify the independent analog parts (420, 431, 432, 433). One of the independent parts, which is a audible response, is selected by the user and used to generate a response.

19 Claims, 7 Drawing Sheets

MULTIPART ANALOG MESSAGE AND A RESPONSE IN A COMMUNICATION SYSTEM

RELATED APPLICATIONS

Application Ser. No. 08/395,747 filed Feb. 28, 1995 by Leitch et al., entitled "VOICE COMPRESSION METHOD AND APPARATUS IN A COMMUNICATION SYSTEM" now U.S. Pat. No. 5,689,440.

FIELD OF THE INVENTION

This invention relates in general to analog communication systems, and in particular to transmitting a message within a synchronous protocol to a receiving device, wherein the message includes a plurality of independent analog parts.

BACKGROUND OF THE INVENTION

In two way communication systems such as those described in U.S. Pat. No. 4,875,038 filed Jan. 7, 1988 by Siwiak et al., entitled "Frequency Division Multiplexed Acknowledge Back Paging System," hereinafter referred to as Siwiak '038, it is desirable to provide a pager radio user with several possible responses from which one response is selected to be transmitted back to the paging fixed network, where it is sent to the caller who initiated the call. One method of providing such responses in a pager is described in U.S. Pat. No. 5,153,582 filed Aug. 7, 1989 by Davis, entitled "Method and Apparatus for Acknowledging and Answering a Paging Signal," hereinafter referred to as Davis '582.

In an analog communication system such as that described in application Ser. No. 08/395,747 filed Feb. 28, 1995 by Leitch et al., entitled "Voice Compression Method and Apparatus in a Communication System", which is hereby incorporated by reference, and referred to hereinafter as Leitch '747, voice messages are compressed by techniques described therein, and then transmitted on a radio channel or a subchannel of radio channel, using a synchronous protocol, such as the well known InFLEXion™ protocol, licensed by Motorola, Inc. of Shaumburg, Ill.

In a system using such an analog protocol for signals sent from the paging fixed network to the pager, as described in Leitch '747, and having acknowledge capability, as described in Siwiak '038 and Davis '582, it is also desirable to be able to include, in a message that has an information part, a plurality of probable analog responses pertaining thereto, thus avoiding the problem of having either no responses available, or only a rigidly defined set of responses which have been predetermined for use by each pager user, and which may not turn out to pertain to an information part of a particular message. When such probable responses are included within the message received by the pager, they can then be stored in the pager. The user can review the responses, select one, and transmit the response, or an identifier corresponding to that response back to the paging fixed network for delivery to the caller.

A first issue in such a system is how to separate the plurality of probable analog responses carried within the message. One method which can be used is to utilize the predetermined synchronous protocol divisions for identifying the locations of the analog parts. This method would work but has a significant deficiency. The deficiency is determining where the analog responses are located within the synchronous protocol and what their duration is. While this problem can be solved digitally by using pointers and digital duration information, it is fairly complex to have the controller handle the digital position determination while also decompressing and decoding the analog information.

Another issue which arises in a pager having voice response capabilities is how to provide for user selection of one of the voice responses. In an alphanumeric pager such as described in Davis '582, the problem is solved by dedicating several keys for response selection. When there are at least a moderate (say, 8 to 12) number of keys, dedicating several for response selection works well. However, in simple analog pagers, in which there may be only a very few keys (i.e., less than 8, and perhaps as few as 2), a problem arises as to how a selection of a voice response is conveniently made.

What is needed is a technique for identifying a plurality of analog responses included in an analog message, which is efficient in terms of the required complexity of decoding and channel time used.

DETAILED DESCRIPTION OF THE DRAWINGS

Figure 1:
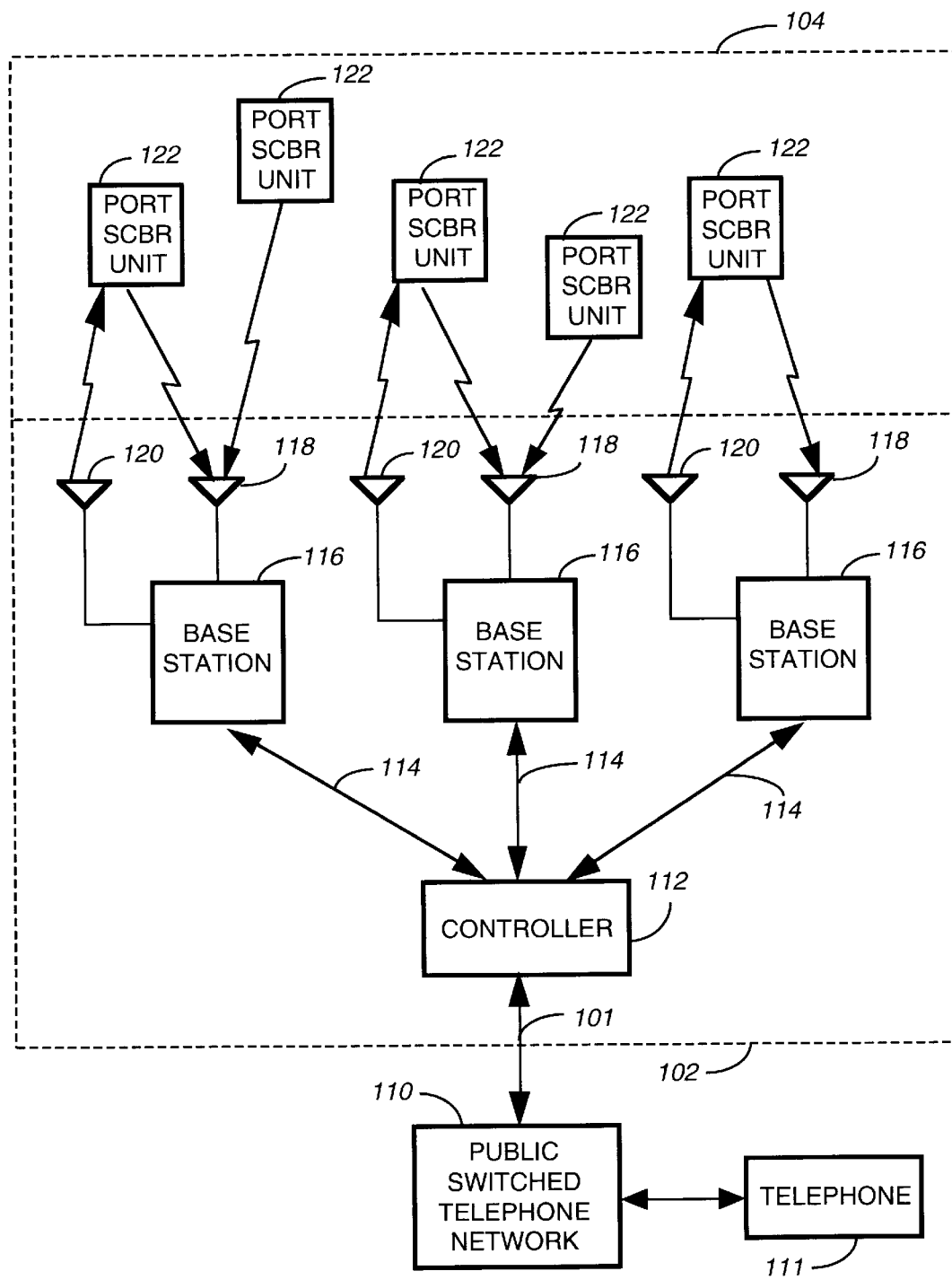
FIG. 1 is an electrical block diagram of a radio communication system, in accordance with the preferred embodiment of the present invention.

Referring to FIG. 1, an electrical block diagram of a communication system in accordance with the preferred embodiment of the present invention comprises a fixed portion 102 and a portable portion 104. The fixed portion 102 includes a plurality of base stations 116, for communicating with the portable portion 104, utilizing conventional radio frequency (RF) techniques well known in the art, and coupled by communication links 114 to a system controller 112 which controls the base stations 116. The hardware of the system controller 112 is preferably a combination of the Wireless Messaging Gateway (WMG™) Administrator! paging terminal, and the RF-Conductor!™ message distributor manufactured by Motorola, Inc. The hardware of the base stations 116 is preferably a combination of the Nucleus® Orchestra! transmitter and RF-Audience!™ receivers manufactured by Motorola, Inc. It will be appreciated that other similar hardware can be utilized for the system controller 112 and the base stations 116.

Each of the base stations 116 transmits RF signals to the portable portion 104 comprising a plurality of selective call radios 122 via a transmitting antenna 120. The base stations 116 each receive RF signals from the plurality of selective call radios 122 via a receiving antenna 118. It will be appreciated that, alternatively, the base stations 116 are utilized for RF transmissions only (i.e., one-way transmission). The RF signals transmitted by the base stations 116 to the selective call radios 122 (outbound messages) comprise selective call addresses identifying the selective call radios 122, and data or voice messages originated by a caller.

The RF signals transmitted by the selective call radios 122 to the base stations 116 (inbound messages) comprise positive acknowledgments (ACKs) which indicate that the message was received reliably by the selective call radio 122, or negative acknowledgments (NAKs) which indicate that the selective call radio 122 did not receive the message reliably. A detailed description of inbound acknowledge-back messaging is more fully described in Siwiak '038, which is hereby incorporated by reference. It will be appreciated that a portion of the selective call radios 122 are utilized for RF reception only (i.e., one-way receivers).

The system controller 112 is preferably coupled by telephone links 101 to a public switched telephone network (PSTN) 110 for receiving selective call originations therefrom. Selective call originations comprising voice and data messages from the PSTN 110 can be generated, for example, from a conventional telephone 111 coupled to the PSTN 110 in a manner that is well known in the art.

Voice messages transmitted by the base stations 116 utilize mixed signaling techniques. A voice message preferably includes a digital message portion and an analog message portion. The digital message portion includes at least the addressing information which is used to identify the selective call radio 122, and a message vector identifying the location of the analog message. The digital message portion and analog message portion are transmitted using a synchronous protocol which is preferably similar to Motorola's well-known FLEX™ family of digital selective call signaling protocols as described more fully in U.S. Pat. No. 5,168,493 issued Dec. 1, 1992 to Nelson et al., which is hereby incorporated herein by reference, and hereinafter referred to as Nelson '493. This synchronous protocol utilizes well-known error detection and error correction techniques and is therefore tolerant to bit errors occurring during transmission, provided that the bit errors are not too numerous in any one code word.

Outbound channel transmissions of the digital message portion transmitted by the base stations 116 preferably utilize two and four-level frequency shift keyed (FSK) modulation, operating at sixteen hundred or thirty two hundred symbols-per-second (sps), depending on traffic requirements and system transmission gain. Outbound channel transmissions of the analog message portion transmitted by the base stations 116 preferably utilize single side band (SSB) transmission. A voice message portion preferably comprises at least an upper side band (USB), a lower side band (LSB) and a pilot carrier. It will be appreciated that, alternatively, a voice message portion can comprise the pilot carrier and a single one of the sidebands. A detailed explanation of the preferred analog voice messaging system can be found in Leitch '747, which is assigned to the assignee of the present invention and which is hereby incorporated by reference. Inbound channel transmissions from the selective call radios 122 to the base stations 116 preferably utilize four-level FSK modulation at a rate of eight hundred bits per second (bps). Inbound channel transmissions preferably occur during predetermined data packet time slots synchronized with the outbound channel transmissions. The outbound and inbound channels preferably operate on separate carrier frequencies utilizing frequency division multiplex (FDM) techniques well known in the art. A detailed description of FDM techniques is more fully described in U.S. Pat. No. Siwiak '038. It will be appreciated that, alternatively, the outbound and inbound channels can operate on a single carrier frequency using time division duplex (TDD) techniques as described more fully in Nelson '493. It will be further appreciated that, alternatively, other synchronous signaling protocols can be used to transmit the digital and analog portions of the message, and that other digital modulation schemes and transmission rates can be used for either or both transmission directions, and that other analog compression techniques, or no analog compression can be used for the analog portion of the message.

Each of the selective call radios 122 assigned for use in the radio communication system has an address assigned thereto which is a unique selective call address. The address enables the transmission of a message from the system controller 112 only to the addressed selective call radio, and identifies messages and responses received at the system controller 112 from the selective call radio. Furthermore, each of one or more of the selective call radios 122 can have a unique telephone number or access number assigned thereto. A list of the assigned selective call addresses and correlated telephone numbers for the selective call radios is stored in the system controller 112 in the form of a subscriber data base.

Figure 2:
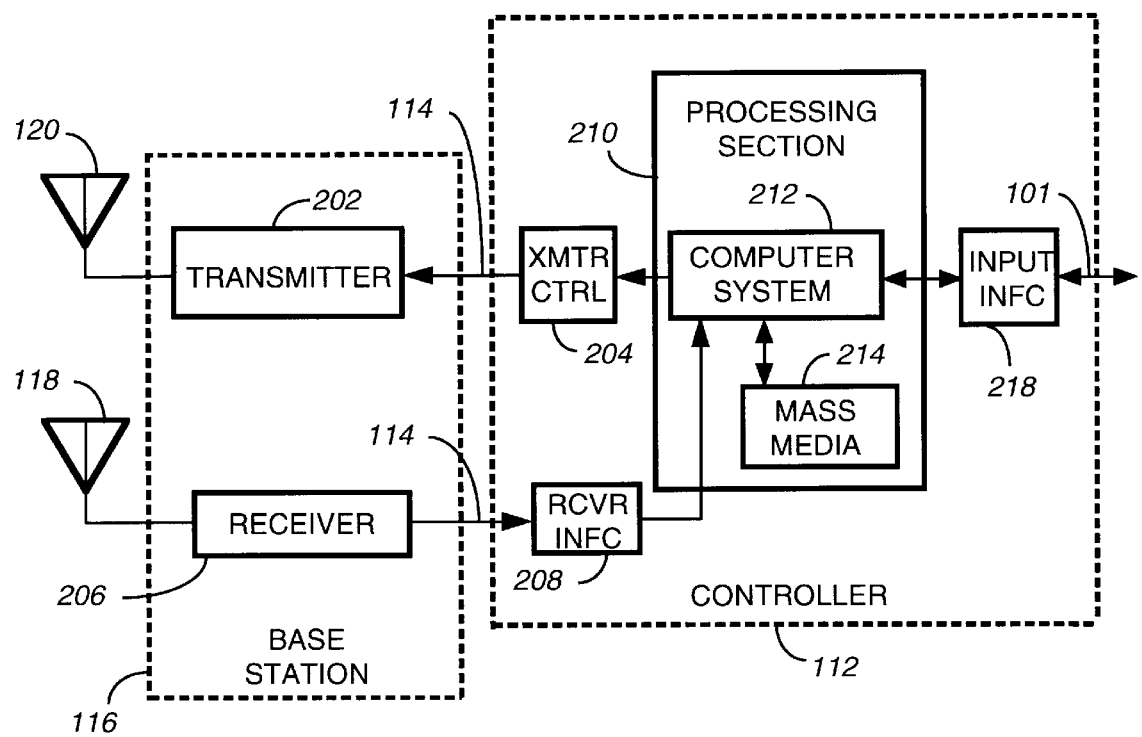
FIG. 2 is an electrical block diagram of a system controller used in the radio communication system, in accordance with the preferred and alternative embodiments of the present invention.

Referring to FIG. 2, an electrical block diagram of elements of the fixed portion 102 in accordance with the preferred embodiment of the present invention comprises portions of the system controller 112 and the base stations 116. The system controller 112 comprises a processor section 210 for directing operation of the system controller 112. The system controller 112 schedules and queues data and stored voice messages for transmission to the selective call radios 122, connects telephone calls from the PSTN 110, and receives acknowledgments, demand responses, unsolicited data and stored audio messages, and telephone calls from the selective call radios 122.

The processor section 210 preferably is coupled through a conventional transmitter controller 204 to a transmitter 202 via the communication links 114. The communication links 114 use conventional means well known in the art, such as a direct wire line (telephone) link, a data communication link, or any number of radio frequency links, such as a radio frequency (RF) transceiver link, a microwave transceiver link, or a satellite link, just to mention a few. The transmitter 202 transmits two and four-level FSK data messages to the selective call radios 122 during a digital message portion, and at least one LSB, USB and a pilot during the analog message portion for voice messages. The analog message portion is preferably analog to digital converted to a conventional high speed digitally sampled signal, in a manner well known to one of ordinary skill in the art, for transmission over the communication links 114, then reconverted back to the analog message portion by the transmitter 202. The processor section 210 is also coupled to at least one receiver 206 through a conventional receiver interface 208 via the communication links 114. The receiver 206 demodulates four-level FSK and is preferably collocated with the base stations 116, as implied in FIG. 2, but can be positioned remotely from the base stations 116 to avoid interference from the transmitter 202. The receiver 206 is for receiving one or more acknowledgments (ACKs or NAKs) from the selective call radios 122.

The processor section 210 is also coupled to an input interface 218 for communicating with the PSTN 110 through the telephone links 101 for receiving selective call originations from a message originator. In order to perform the functions (to be described below) necessary in controlling the elements of the system controller 112, as well as the elements of the base stations 116, the processor section 210 preferably includes a conventional computer system 212, and conventional mass storage media 214. The conventional mass storage media 214 includes the subscriber data base which has subscriber user information such as, for example, selective call radio 122 addressing, programming options, etc. The conventional computer system 212 is programmed by way of program instructions included in the conventional mass storage media 214. The conventional computer system 212 preferably comprises a plurality of processors such as VME Sparc processors manufactured by Sun Microsystems, Inc., and is alternatively described as the computer 212. The plurality of processors include memory such as dynamic random access memory (DRAM), which serves as a temporary memory storage device for scratch pad processing such as, for example, storing analog and digital messages originated by callers using the PSTN 110, processing acknowledgments received from the selective call radios 122, and for protocol processing of analog and digital messages destined for the selective call radios 122, just to mention a few. The conventional mass storage media 214 is preferably a conventional hard disk mass storage device, which can also serve as a message memory for digitally encoded analog signals.

It will be appreciated that other types of conventional computer systems 212 can be utilized, and that additional computer systems 212 and mass storage media 214 of the same or alternative type can be added as required to handle the processing requirements of the processor section 210.

The processor section 210 provides message handling functions which schedule outbound messages having selective call addresses associated therewith, for transmission within a transmission cycle of the synchronous protocol. This is accomplished by scheduling, as necessary, portions of messages within different frames of a transmission cycle. As described above, messages may have either digital information, such as a alphanumeric message, or analog information, such as voice. An analog message is included within one or more analog frames. Inasmuch as the analog information is typically a voice signal, the analog frame is alternatively called a voice frame.

The processor section 210, while performing the message handling functions, also identifies inbound messages as being associated with one of the selective call radios in the subscriber data base 220 and identifies response messages as being associated with one of the outbound messages in an outbound message memory, which is a portion of the mass media 214. As one example of an operation of the system controller 112, the delivery of an outbound message stored in the mass memory 214 is completed when: the outbound message has been communicated to the intended selective call radio 122; the outbound message is acknowledged by an inbound acknowledgment generated by the selective call radio 122; the outbound message and some possible responses are presented either on a display or by a speaker of the selective call radio 122 in response to a user manipulation of controls; one of the possible responses is selected by the user and identified within an inbound response transmitted back to the system controller 112 from the selective call radio 122; and the user inbound response is identified by the message handler function as having been generated by the user specifically in response to the outbound message. In this example, the processor section 210 generates another message which is sent to the originator of the outbound message to notify the originator that the outbound message has been acknowledged by the selective call radio 122 and responded to by the user of the selective call radio 122.

The processor section 210 performs functions including the message handing functions described above, which are conventional, and functions described below with reference to FIG. 4, which are unique. The conventional and unique functions are executed by the conventional computer system 212 and controlled by program instructions stored in the mass storage media 214. The unique functions are controlled by a unique set of program instructions generated using conventional programming tools.

Figure 3:
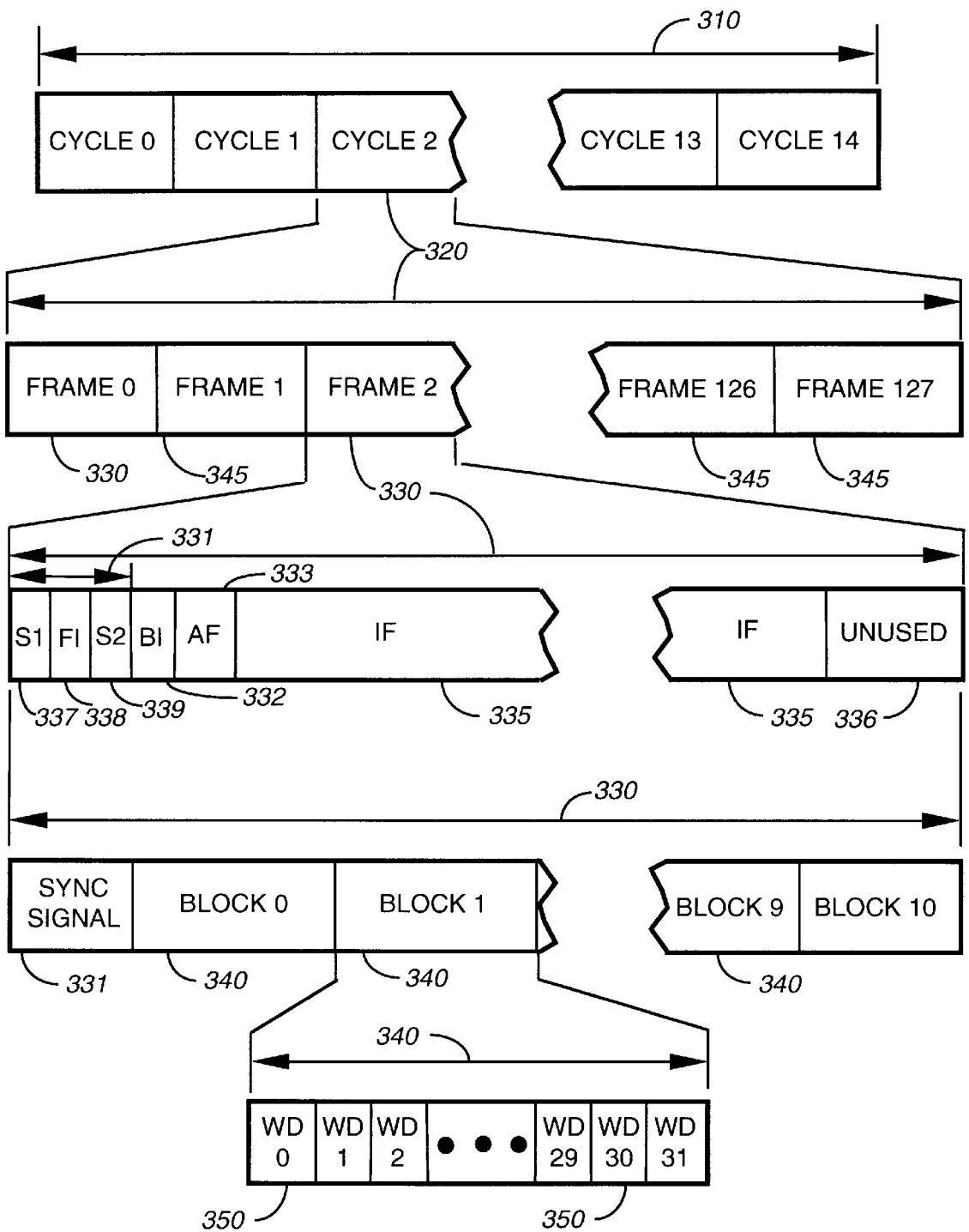
FIG. 3 is a timing diagram which illustrates features of the transmission format of a synchronous outbound signaling protocol utilized by the radio communication system, in accordance with the preferred and alternative embodiments of the present invention.

Referring to FIG. 3 a timing diagram which illustrates features of the transmission format of a synchronous outbound signaling protocol utilized by the radio communication system of FIG. 1, and which includes details of a control frame 330 (alternatively described as a data frame 330), in accordance with the preferred and alternative embodiments of the present invention. Control frames 330 are also classified as data frames 330. The outbound signaling protocol is subdivided into protocol divisions, which are an hour 310, a cycle 320, a frame 330, 345, a block 340, a word 350, and bits (not shown in FIG. 3). All protocol divisions are defined with reference to a synchronous period of a synchronous clock; the protocol division boundaries are coincident with edges of the synchronous clock. Up to fifteen 4 minute uniquely identified cycles are transmitted in each hour 310. Normally, all fifteen cycles 320 are transmitted each hour. Up to one hundred twenty eight 1.875 second uniquely identified frames including control frames 330 and analog frames 345 are transmitted in each of the cycles 320. Normally, all one hundred twenty eight frames are transmitted. One synchronization signal 331 lasting one hundred fifteen milliseconds and 11 one hundred sixty millisecond uniquely identified blocks 340 are transmitted in each of the control frames 330. The synchronization signal 331 includes a first sync portion 337, a frame information word 338, and a second sync portion 339. A bit rate of 1600 bits per second (bps), 3200 bps, or 6400 bps is usable during the blocks 340 of each control frame 330. The bit rate of the blocks 340 of each control frame 330 is communicated to the selective call radios 122 during the synchronization signal 331. Depending on the bit rate used, 8 to 32 thirty two bit uniquely identified words 350 are transmitted in each block 340. The bits and words 350 in each block 340 are transmitted in an interleaved fashion using techniques well known to one of ordinary skill in the art to improve the burst error correction capability of the protocol.

Information is included in each control frame 330 in information fields, comprising system information in the frame information word 338 and a block information field (BI) 332, one or more selective call addresses in an address field (AF) 333, one or more of a set of vector packets, short message packets, and long messages in the information field (IF) 335, and an unused field 336 having no useful information therein. One aspect of system information included in the frame information word 338 is the frame number and the cycle number. The cycle number is a number from zero to 15 which identifies each cycle 320. The frame number is a number from zero to one hundred twenty seven which identifies each frame 330, 345 of a cycle 320. Each vector packet and short message packet in the information field 335 of a control frame 330 corresponds to at least one of the addresses in the address field 333 of the same control frame 330. Each long message in the information field 335 corresponds to at least one vector packet in the information field 335 of at least one or more control frames 330. The length of each of the fields 332, 333, 335, 336 can be shorter or longer than a block 340. The unused field 336 can be zero length when the total of the lengths of the other fields 332, 333, 335 equals eleven blocks 340. The block information field 332 in frame zero includes the following real time information: year, month, day, date, hour, minute, and one-eighth minute.

The vectors contain information which specifies the starting word of a long message in terms of the protocol divisions described above, and additionally, radio channel information such as radio channel frequency, and subchannel offset from the radio channel frequency. The starting position and length of a long message, a short message, or a vector packet define the protocol position of the long message, short message, or vector packet.

When a selective call radio 122 detects its own address within a control frame 330, the selective call radio 122 processes the associated vector packet or short message packet within the control frame 330. When a selective call radio 122 decodes a vector packet in a control frame 330 which corresponds with its selective call address, the selective call radio 122 is directed to receive and decode a long message or an analog message in either the same control frame 330, or another control frame 330 or an analog frame 345.

Figure 4:
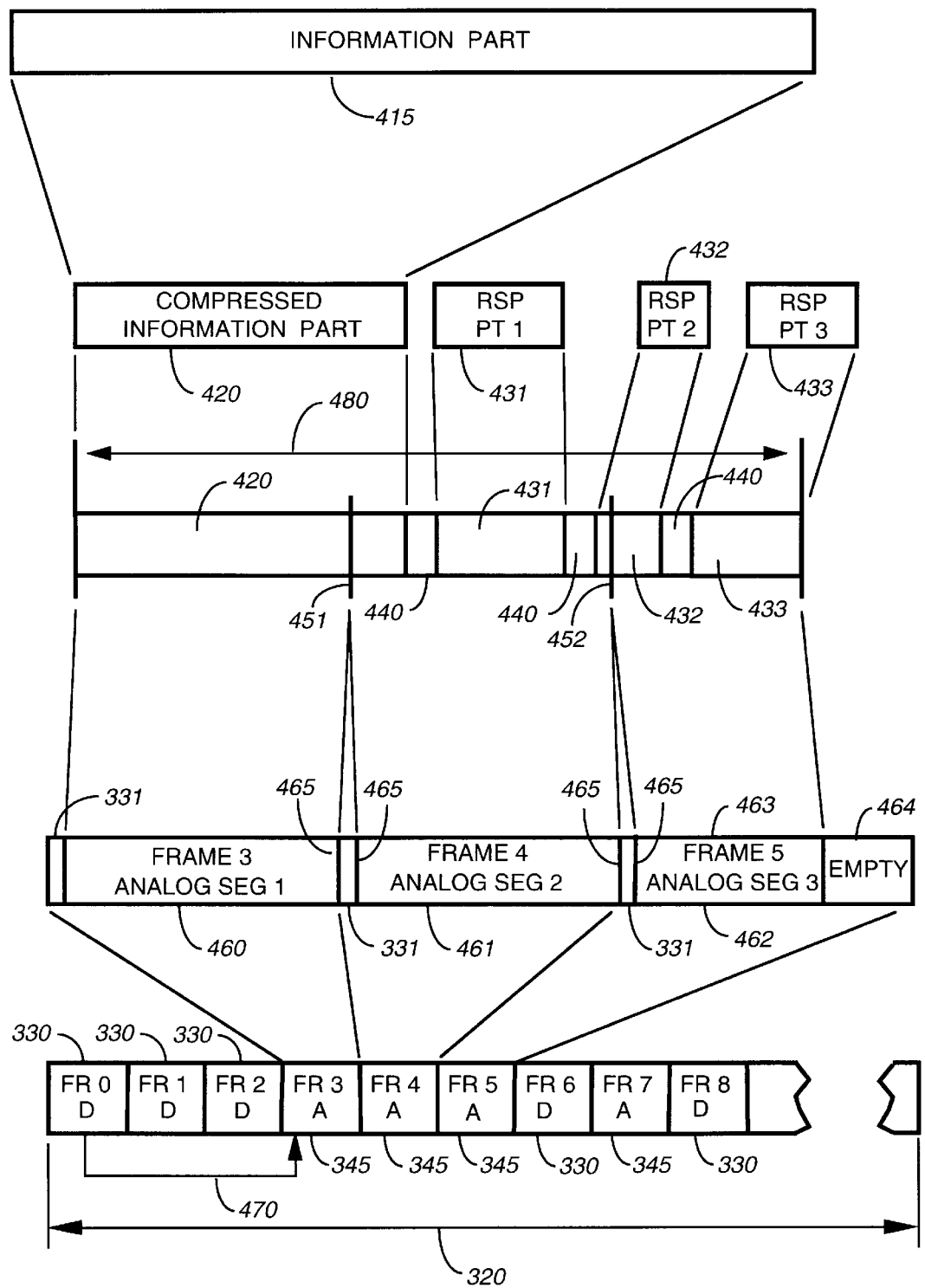
FIGS. 4 and 5 are a timing diagram and flow chart which illustrate an example of an assembly and inclusion of a multipart analog message within a cycle of the synchronous outbound protocol transmitted in the radio communication system, in accordance with the preferred embodiment of the present invention.
Figure 5:
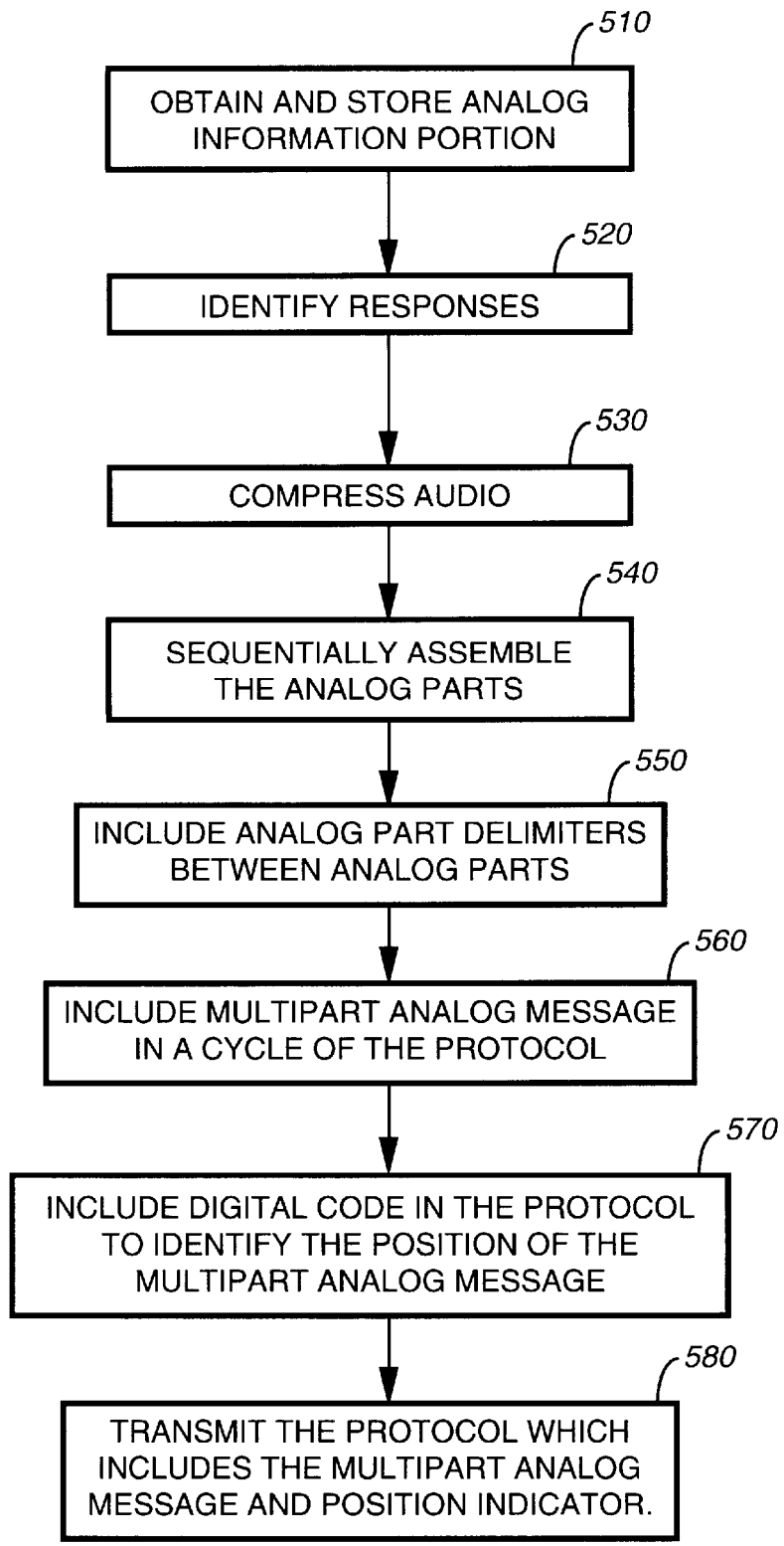

Referring to FIGS. 4 and 5, a timing diagram and a flow chart illustrate an example of an assembly and inclusion of a multipart analog message in analog form within a cycle 320 of the synchronous outbound protocol transmitted in the radio communication system, in accordance with the preferred embodiment of the present invention. The processor section 210 obtains and stores in the mass memory 214, at step 510 (FIG. 5), an information portion 415 (FIG. 4) of an analog message which is to be transmitted to a selective call radio 122. For example, the information portion is an analog signal generated by a voice message received from an originating caller by means of the telephone 111, in which the originating caller says "Can you go to lunch with me at 12:30?" The information portion 415 is preferably stored as a digitally sampled analog signal in the mass media 214.

At step 520 (FIG. 5), the originating caller further identifies, at the time of the call, several responses from which the user of the selective call radio 122 can select to respond to the question posed. For example, a first response is "Yes," a second is "No," and a third is "Maybe." These responses are preferably obtained from the originating caller by the use of an interactive session which is controlled by the processor section 210, using stored voice prompts presented to the caller and a combination of voice and keypad responses on the part of the originating caller. For example, when the originating caller has stated his initial information portion of the message, the processor section presents a stored voice message "Do you wish to add possible responses to your message? Press 1 for yes and 2 for no." When the processor section receives a dual tone multifrequency (DTMF) code representing a 1, the processor section presents a stored voice message "Please enter each response, followed by the pound key." This is the preferred method of obtaining the response portions. The response portions are likewise stored in a digitized sampled analog form in mass memory 214. The independent information portion and response portions thus obtained and stored at these first steps 510, 520 of sending a multipart analog message are then time compressed at step 530 (FIG. 5) by the processor section 210 into shorter independent analog parts 420, 431, 432, 433 (FIG. 4) which are stored in the mass media 214 in digitally sampled form. The preferred compression technique is described in Leitch '747. The information and response portions are termed independent analog parts because each of them conveys appropriately complete information when presented independently from the other. In a first alternative approach, ten predetermined, commonly used voice responses are obtained, compressed, and stored in the mass media 214 in digitized analog form during a configuration of the system controller 112, and the originating caller selects from among them by the use of the keypad of the telephone 111 at step 520.

Having thus identified independent analog parts 420, 431, 432, 433 of a message which is to be transmitted to a selective call radio 122, the processor section sequentially assembles the independent analog parts 420, 431, 432, 433 at step 540 (FIG. 5), with the response parts 431, 432, 433 preferably following the information part 420, although other sequences could alternatively be used. The processor section then, at step 550 (FIG. 5), includes analog part delimiters 440 (FIG. 4) between the successive independent analog parts 420, 431, 432, 433 which are sequentially assembled, with no analog signal gaps between the analog part delimiters 440 and the independent analog parts 420, 431, 432, 433, thereby generating a seamless multipart analog message 480. At step 560 (FIG. 5), the processor section includes the multipart analog message 480 within a cycle of the synchronous protocol, at a position in the synchronous protocol. In this example, the multipart analog message 480 is included in frames 3, 4, 5 of the outbound synchronous protocol, by being broken into analog segments 460, 461, 462 (FIG. 4). It will be appreciated that the segments 460, 461, 462 are generated by the processor section by splitting the seamless multipart analog message 480 at boundaries 451, 452 (FIG. 4) such that the segments 460, 461, 462 will fit within frames 345 of the synchronous protocol. It will be appreciated that the first two segments 460, 461 fill the frames number 3 and 4, but that the third segment 463 does not fill frame number 5, leaving an empty portion 464 of that frame.

The term "position" in this context means the identification of the beginning of all segments of the multipart analog message 480, as well as their duration and ordering within the multipart analog message 480, so that the multipart analog message 480 can be reconstructed. At step 570 (FIG. 5), the processor section 210 includes a digital code within the synchronous protocol which identifies the position of the multipart analog message 480 within the synchronous protocol. In accordance with the preferred embodiment of the present invention, the position is identified by a binary code included in a data frame 330 which identifies the frame number (3, in this example) of the analog frame 345 at which the multipart analog message 480 starts, and how many frames it occupies. The data frame 330 and analog frames 345 are coupled from the system controller 112 to the transmitter 202, where they are modulated on a radio carrier and transmitted by the antenna 120, at step 580.

The digital code which provides the identification of the analog frame 345 at which the multipart analog message 480 starts is a vector, as described above, and is illustrated in FIG. 4 by the arrow 470. In accordance with the preferred embodiment of the present invention, analog message segments predeterminedly begin immediately after the end of the synchronizing signal 331. Also, an analog frame 345 is defined to include a segment of only one analog message, and multiple segments are included in order, within sequential frames. Thus, the position is conveyed only by the position of the first frame (its hour, cycle, and frame number) and the number of frames. It will be appreciated that there are other ways to transmit the segments and convey the position of the multipart analog message 480, which work equally well. For example, in some systems the segments 460, 461, 462 may be included within one frame. Such an arrangement is useful in a radio communication system in which there are several analog subbands within an outbound channel resource, and several analog segments can be transmitted simultaneously. In such a case, to include the position of the multipart analog message 480 within the protocol, the order and subband number of the analog segments must either be conveyed in a message, or predetermined. In another example, segments of a multipart message which are transmitted in order and in consecutive frames can have their position identified by a continuation indication within the synchronizing portion of each frame.

It will be appreciated that, in accordance with the preferred embodiment of the present invention, although the beginning of the multipart analog message 480 is coincident with an edge of the synchronous clock occurring at the end of the synchronizing signal 331, the durations of the independent analog parts 420, 431, 432, 433, and the duration of the analog part delimiters 440 are determined irrespective of the synchronous clock and therefore are not necessarily synchronized to the synchronous periods, and the boundaries between the analog part delimiters 440, and the independent parts are not necessarily coincident with the edges of the synchronous clock.

In accordance with the preferred embodiment of the present invention, the analog part delimiters 440 are DTMF tones of predetermined duration, selected from those commonly associated with the keys of a standard telephone, which are well known to one of ordinary skill in the art. The DTMF tones are stored after being compressed in the same manner as the independent analog parts 420, 431, 432, 433. The predetermined duration of the analog part delimiters 440 is chosen such that there is an acceptably small probability that an equivalent signal will be generated within the independent analog parts 420, 431, 432, 433. For example, a DTMF tone having a duration of 60 milliseconds is not likely to be inadvertently generated in typical voice phrases. To completely eliminate falsing, the analog parts are tested before the part delimiters 440 are added to determine if any part is unacceptably close in frequency and duration to the predetermined DTMF tones, in which case the duration of the part is changed to prevent falsing. In accordance with the preferred embodiment the DTMF tones which are included in the multipart analog message 480 are selected to be the tones representing the keys 1, 2, 3 . . . , up to the number of response parts included in the message. Thus, each analog part delimiter 440 has a different code. It will be appreciated that by this arrangement, a selected response can be identified in the response message sent from a selective call radio 122 by the code conveyed by the delimiter immediately preceding the response part. In a variation to this embodiment, only one DTMF tone is used and the selective call radio 122 simply counts and uses the ordinal position of each part to identify it in a response message.

In yet another variation of the preferred embodiment, the analog part delimiters 440 are null analog signals of predetermined duration; that is, they are silence. In this embodiment, the independent analog parts are preprocessed before being compressed to eliminate any periods of silence having a duration equivalent to the null delimiters. In other variations, analog coding schemes other than DTMF can be used, such as single tones.

Figure 6:
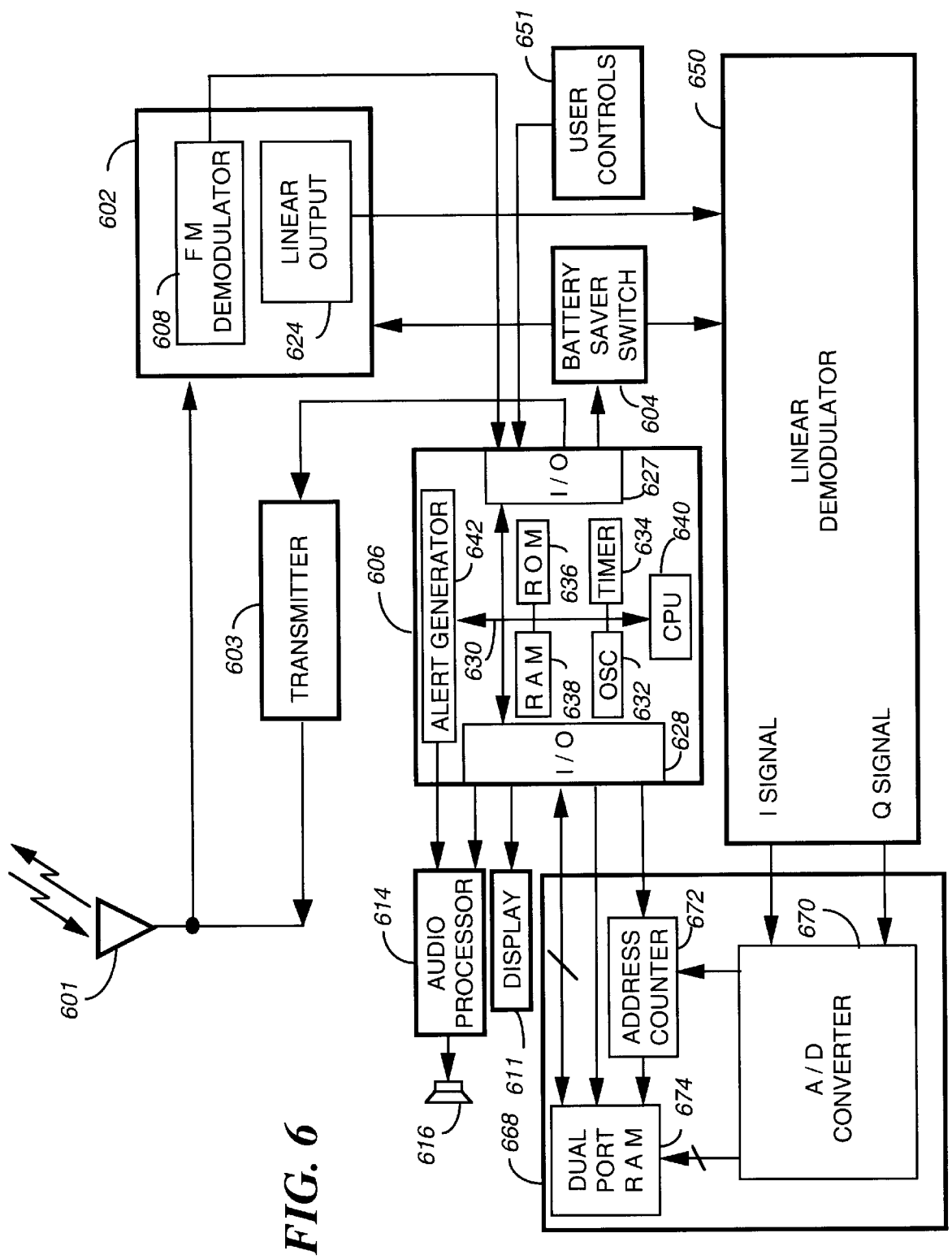
FIG. 6 is an electrical block diagram of a multichannel selective call radio, in accordance with the preferred embodiment of the present invention.

Referring to FIG. 6, an electrical block diagram of the selective call radio 122 is shown, in accordance with the preferred embodiment of the present invention. Selective call radio 122 is essentially equivalent to the selective call receiver 900 described with reference to FIG. 9 of Leitch '747, but additionally comprises a conventional transmitter 603 for transmitting response messages and acknowledgments, and further comprises functions for generating the response messages and acknowledgments. The selective call radio 122 comprises an antenna 601, which is different than the antenna included in the selective call receiver 900 of Leitch '747 in that it is suitable for both intercepting and radiating radio signals. As described in Leitch '747, the selective call radio 122 further comprises a means for detecting and decoding the FM modulated control signals and the SSB analog signals which are included in the synchronous protocol, which is similar to the well known InFLEXion™ protocol, licensed by Motorola, Inc. The selective call radio 122 further comprises a receiver 602, a processor section 606, a battery saver switch 604, user controls 651, a linear demodulator 650, an analog conversion and message storage section 668, a display 611, an audio processor 614, and a speaker 616. The receiver 602, which is coupled to the antenna, comprises an FM demodulator 608 and a linear output section 624. The battery saver 604, or battery economy circuit, is coupled to and operates under control of the processor section 606. The analog conversion and message storage section 668 comprises an analog-to-digital converter 670, an address counter 672 and random access memory (RAM) 674. The receiver 602 is preferably a modified FM receiver including the addition of a DAFC (digital automatic frequency control) as described in U.S. Pat. No. 5,239,306 issued to Siwiak et al. (which is assigned to the assignee of the present invention and which is hereby incorporated by reference herein), an AGC (automatic gain control), and which provides for an intermediate frequency (IF) output (not shown in FIG. 6) at a point following most of the receiver gain but prior to the FM demodulator.

The same processor that controls Motorola's InFLEXion™ protocol compatible pagers would adequately handle all the protocol functions in the present invention including the address recognition and message decoding of an FM demodulated signal. Additionally, in response to an FM modulated address (and message position code words), the processor section 606 initiates the operation of the analog conversion and message storage section 668, which samples either or both of an I (In-phase) and a Q (quadrature) linearly modulated signal at outputs of the linear demodulator 650. The I and Q signal samples are written directly to the dual port RAM 674 with the aid of the address counter 672, in response to a control signal from the processor section 606, which is a well known direct memory access technique.

A voice signal can be sent as an SSB signal occupying a single voice bandwidth on the outbound channel, or equivalently on either of the one or more I or Q channels as described in more detail in Leitch '747. Direct memory access by the analog-to-digital converter 670 allows the use of a processor whose speed and power are not a direct function of the channel data rate. That is, a microprocessor can be used with direct memory access, whereas, a significantly higher speed processor would be required if the analog-to-digital converted data were read to memory through the microprocessor.

The processor section 606 comprises a microprocessor 640, RAM 638, a read only memory (ROM) 636, a timer 634, an oscillator (OSC) 632, a data bus 630, a first input/output (I/O) 627, a second I/O 628, and an alert generator function 642. Recovered voice is played back through the audio processor 614 and transducer 616, while alphanumeric data can be displayed on display 611, which is a limited display ($\leq 16$ characters) in accordance with the preferred embodiment of the present invention.

An information signal, modulated in the FM modulation format, or in a linear modulation format (such as SSB), is intercepted by the antenna 601, which couples the information signal to the receiver 602. The message information is transmitted on any suitable RF channel, such as those in the VHF bands and UHF bands. The receiver 602 converts the information signal to an IF signal which is suitable for coupling to either the FM demodulator 608 or to the linear output section 624.

When the message information or control data is digital, it is transmitted in the FM modulation format, and the IF signal is coupled to the FM demodulator 608. The FM demodulator 608 demodulates the IF signal in a manner well known to one of ordinary skill in the art, to provide a recovered digital signal, which is a stream of binary information corresponding to the received address and message digital information transmitted in the FM modulation format. The recovered digital signal is coupled to the input of the processor section 606, which functions as a decoder and controller, through an input of input/output port, or I/O port 627. The processor section 606 provides complete operational control of the selective call radio 122, providing such functions as decoding, message storage and retrieval, display control, and alerting, just to name a few. The processor section 606 is preferably a single chip microcomputer such as the MC68HC05 microcomputer manufactured by Motorola, and includes the CPU 640 for operational control. The first I/O port 627 and second I/O port 628 are portions of a single I/O port in the MC68HC05 microcomputer implementation of the preferred embodiment of the present invention. The internal bus 630 connects each of the operational elements of the processor section 606. Second I/O port 628 provides a plurality of control and data lines providing communications between the processor section 606 and external circuits, such as the battery saver switch 604, the audio processor 614, the display 611, and the analog conversion and message storage section 668. A timing means, such as timer 634 is used to generate the timing signals required for the operation of the selective call radio 122, such as for battery saver timing, alert timing, and message storage and display timing. Oscillator 632 provides the clock for operation of CPU 640, and provides the reference clock for timer 634. RAM 638 is used to store information utilized in executing the various firmware routines controlling the operation of the selective call radio 122, and can also be used to store short messages, such as numeric messages. The ROM 636 contains masked program instructions (binary program codes) used to control the processor section 606 operation, including conventional routines as required for decoding the recovered data signal, battery saver control, message storage and retrieval in the analog conversion and message storage section 668, and general control of the selective call radio 122 operation and message presentation. The ROM 636 further contains masked program instructions which are uniquely organized to provide unique message decoding and recovery functions and response message control as more fully described below. An alert generator function 642 provides an alerting signal in response to decoding the FM modulated signaling information including an address equivalent to a predetermined address stored in non-volatile code memory (not shown in FIG. 6) within the selective call radio 122. The non-volatile code memory is coupled to the processor section 606 through the I/O port 627. The code memory is preferably an EEPROM (electrically erasable programmable read only memory) which stores one or more predetermined addresses to which selective call radio 122 is responsive.

When the FM modulated signaling information is received, it is decoded by the processor section 606, functioning as a decoder in a manner well known to one skilled in the art. When the information in the recovered data signal matches any of several stored predetermined addresses, the subsequently received information is decoded to determine if additional information is directed to the receiver which is modulated in the FM modulation format, or if the additional information is modulated in the linear modulation format. When the additional information is transmitted in the FM modulation format, the decoded message information is received and stored in the microcomputer RAM 638, or in the analog conversion and message storage section 668, as will be explained further below, and an alerting signal is generated by alert generator function 642. The alerting signal is coupled to the audio processing circuit 614 which drives transducer 616, delivering an audible alert. Other forms of sensible alerting, such as tactile or vibrating alert, can also be provided to alert the user.

When analog information is to be transmitted in the linear modulation format (such as SSB or "I and Q"), the processor section 606 decodes pointer information (also called a position identifier) in the digital portion of the message. The pointer information includes information indicating to the receiver 602 on what combination of sidebands (or on what combination of I and Q components) within the channel bandwidth the additional information is to be transmitted and where the sidebands are located. Vectors, as described above with reference to FIG. 3, form a part of the pointer information. The processor section 606 maintains the operation of monitoring and decoding information transmitted in the FM modulation format, until the end of a current portion of the synchronous protocol, at which time a supply of power is suspended to the receiver 602 until the analog frame 345 identified by the pointer is reached, at the beginning of which high speed data is transmitted. When the synchronizing signal 331 has been received, the processor section 606, through I/O port 628 generates a battery saving control signal which couples to battery saver switch 604 to suspend the supply of power to the FM demodulator 608, and to supply power to linear output section 624, the linear demodulator 650, and the analog conversion and message storage section 668, thus starting a process of recovering an analog signal, as will be described below.

The IF signal, which now carries the SSB (or "I and Q") information is coupled to the linear output section 624. The output of the linear output section 624 is processed by the linear demodulator 650 as described in Leitch '747 (with reference to quadrature detector 850 therein) to provide a pair of baseband I and Q audio signals which represent the compressed and companded voice signals.

The I and Q audio signals are coupled to the analog conversion and message storage section 668, in particular to the inputs of the analog to digital converter 670. The A/D converter 670 samples the signals at a rate at least twice the highest frequency component of the I and Q signals coupled from the linear demodulator 650. The sampling rate is preferably 6.4 kilohertz per I and Q channel. It will be appreciated, that the data sampling rate indicated is for example only, and other sampling rates may be used depending upon the bandwidth of the audio message received.

When digital data is received in a digital portion of a message, the processor section 606 decodes the digital information (performing symbol decoding and error detection and correction decoding in a manner well known to one of ordinary skill in the art), and controls the address counter 672 to store the decoded binary information in the RAM 674. When analog data is received in an analog portion of a message, the A/D converter 670 is enabled to allow sampling of the information symbol pairs. The A/D converter 670 generates high speed sample clock signals which are used to clock the address counter 672 which in turn sequentially generates addresses for loading the sampled voice signals into a dual port random access memory 674 through data lines going from the converter 670 to the RAM 674. The analog signals which are loaded at high speed into the dual port RAM 674 in real time, are processed by the microcomputer 606 after all analog signals in a message have been received. The microcomputer 606 accesses the data stored in RAM 674 through data lines and address lines, and in the preferred embodiment of the present invention, generates either character encoded information in the case of alphanumeric message data having been received, or digitized sampled data of the information symbol pairs in the case voice was transmitted. The digitized voice samples can alternatively stored in formats such as CVSD (Continuous Variable Slope Delta modulation), or LPC (Linear Predicitive Coding) based formats. In the case of time compressed voice signals, the stored ADC samples are processed by CPU 640 by bringing them in from the dual port RAM 674 and second I/O 628 to (1) amplitude expand the audio signal and (2) time-expand the signal as described in Leitch '747, and store the now decompressed analog (typically, voice) signal in RAM 674, in digitally sampled form. The alphanumeric or voice data is stored in the dual portRAM 674 until the information is requested for presentation by manipulation of the user controls 651. When a stored alphanumeric encoded message is to be read, the user actuates a display message read switch (a portion of the user controls 651) which enables processor section 606 to recover the data, and to present the recovered data to a display 611, such as a liquid crystal display. When a voice message is to be presented audibly, the user actuates an audio message read switch which enables the processor section 606 to recover the data from the dual port RAM 674, and to present the recovered digitally sampled data to the audio processor 614 which converts the digitally sampled data into an analog voice signal which is coupled to a speaker 616 for presentation of the voice message to the user.

Inbound messages (response messages and acknowledgments) are generated in conventional digital form by a inbound message function of the processor section 606, in response to user manipulation of the user controls 651 or an event detected by the processor section 606, such as receipt of an outbound message or occurrence of a predetermined time of day. A digital inbound message is encoded using a conventional FM protocol and coupled by the first I/O port 627 to the transmitter 603, in a manner well known to one of ordinary skill in the art. The conventional transmitter 603 generates an FM radio signal, which is radiated by the antenna 601.

It will be appreciated that the processor section 606 could alternatively comprise other processors, such as digital signal processors, either as single integrated circuits or a plurality of integrated circuits.

It will be appreciated that, in accordance with the preferred embodiment of the present invention, the selective call radio 122 is designed for the presentation of audible messages to the user, and has a very limited set of user controls 651 (less than 7 keys). The selective call radio 122 is optionally sold as a model not having the alphanumeric display 644. Accordingly, the selection of a response to a message received by the selective call radio 122 is accomplished in a simple manner, requiring no use of the alphanumeric display 644, as described below.

Figure 7:
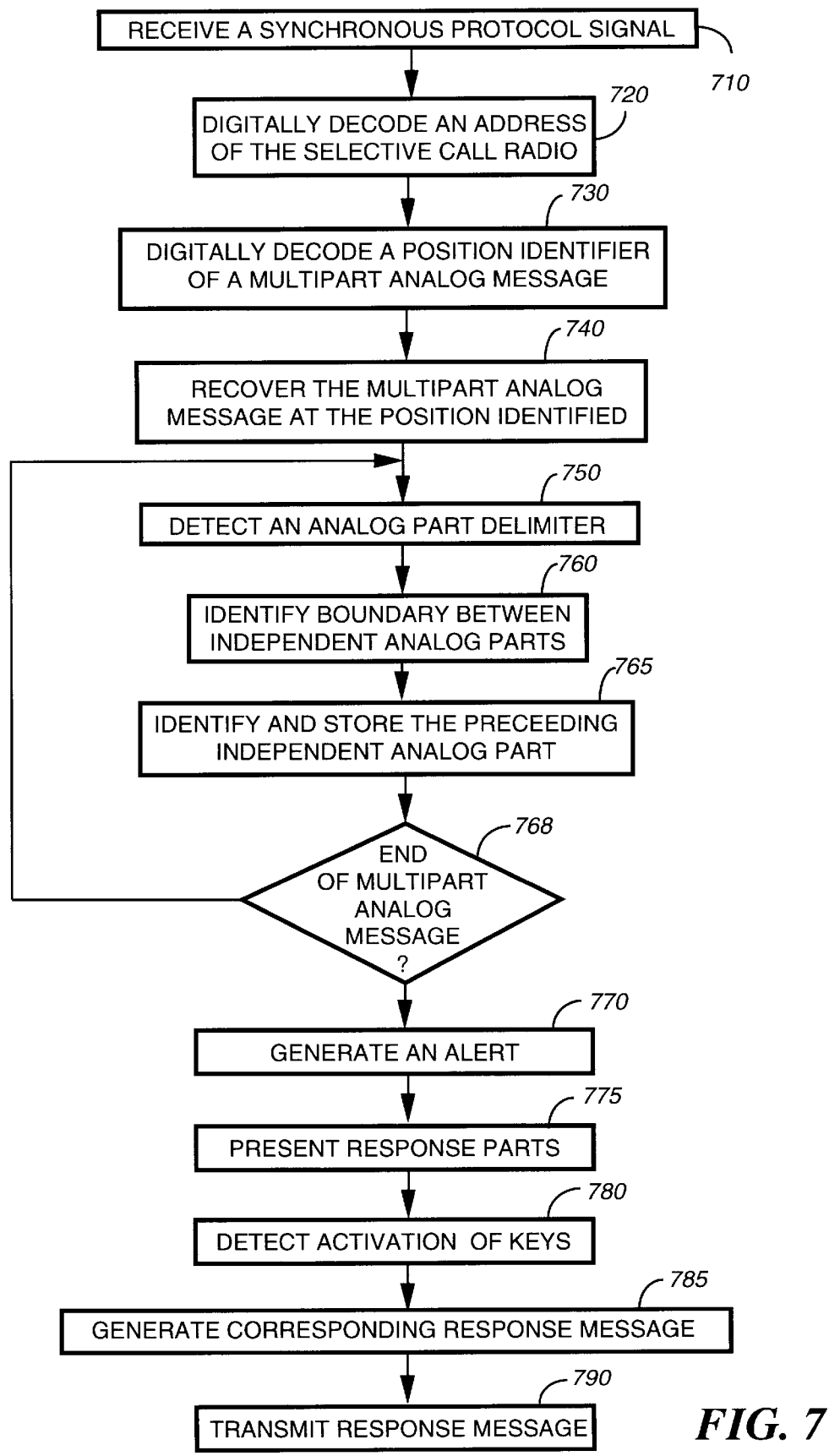
FIG. 7 is a flow chart of a method used in the selective call radio for receiving and responding to a multipart analog message, in accordance with the preferred and alternative embodiments of the present invention.

Referring to FIG. 7, a flow chart is shown which illustrates the method used in the selective call radio 122 for decoding the multipart analog message 480 and generating a response to the message. At step 710, the antenna 601 intercepts a radio signal which is modulated by information signals in accordance with the synchronous protocol. The information signals are organized into the protocol divisions described above, such as cycles 320 and frames 330, 345 (FIG. 3). Included in a control frame 330 are an address of the selective call radio 122 and position identifier (pointer information) for a multipart analog message 480. The intercepted signal is coupled to the receiver 602, where it is FM demodulated by the FM demodulator 608. At step 720, the processor section 606 digitally decodes address data in the control frame 330 and determines that the predetermined address of the selective call radio 122 matches one of the digitally decoded addresses in the control frame. Position identifier information is digitally decoded by the processor section 606 at step 730. The position identifier includes a vector identifying the frame number of the frame 345 in which the multipart analog message 480 starts, and further indicates in which sidebands segments of the multipart message are located, as well as how many frames include segments of the multipart analog message 480. In accordance with the preferred embodiment of the present invention, the segments of the multipart analog message 480 are located in consecutive analog frames 345. Using the position identifier, the processor section 606 controls power to the receiver 602 to turn off the FM demodulator 608, turn on the linear output section 624, and begin recovering the multipart analog message 480 after the synchronizing signal 331 of the frame 345 has been recovered, at step 740. Recovery of the multipart analog message 480 involves digital sampling of the compressed analog waveform and digital signal processing to decompress the compressed waveform, as described herein, above. In accordance with the preferred embodiment of the present invention, while the processor section 606 is processing the digitally sampled multipart analog message 480 to decompress the compressed analog signal, the processor section 606, at step 750, analyzes the decompressed, digital samples of the analog signal, using conventional digital signal processing techniques, to detect any of a set of predetermined analog part delimiter signals, which are dual tone multifrequency (DTMF) signals of a common predetermined duration, such as 60 milliseconds.

It will be appreciated that the detection of the analog part delimiter 440 is done without reference to the synchronous periods or clock edges which define the synchronous protocol. When one of the set of DTMF signals is detected at step 750, the processor section 606 identifies a boundary between a preceding independent analog part and a succeeding independent analog part, at step 760, and determines which digit the DTMF signal represents. The processor section 606 stores the preceding independent analog part in the RAM 674, at step 765, identifying it as an audible response by the digit represented by the DTMF signal which preceded it, if any, or else identifying it as the information part of the message when it is the first analog part of the message and no DTMF tone preceded it.

At step 768, when the end of the multipart analog message 480 is reached, as determined by the position identifier which was previously decoded in the digital portion of the message, the last analog part is identified by the DTMF signal which preceded it, and stored in the RAM 674. When the end of the message has not been reached, at step 768, the processing section continues to analyze the digital samples of the analog signal, at step 750. The alert generator function 642 is then activated by the processor section 606, at step 770, and an audible alert is presented to the user. At step 775, the independent analog parts are presented to the user. Depending on a mode selection determined by a prior manipulation of the user controls 651, the information part is presented, followed by the remaining analog parts, which in this example are several possible audible responses from which the user is to select one. The audible responses are presented in order as determined by the DTMF code identified with each. A short time delay, for example 0.4 seconds, is inserted after the presentation of each response, by the processor section 606. At step 780, the processor section 606 responds to a user control activation when it occurs during the time period which includes and extends past an audible presentation of one of the audible responses by the predetermined delay period, by generating a response message at step 785 which corresponds to the audible response presented. The user control is one of the limited set of user controls, which is used during audible responses as a response selector key, but has a different function associated with it when audible responses are not being presented. The response message associated with the audible response (e.g., the code of the DTMF tone associated with the audible response) is transmitted at step 790 by the transmitter 603.

In a first alternative embodiment, at step 775 the DTMF code number is presented on the alphanumeric display concurrently with the presentation of the audibly presented response, and the user has a less limited set of controls 651 by the manipulation of which any one of the responses can be recalled or selected for generating the response transmission.

In a second alternative embodiment of the present invention, the multipart analog message 480 is digitized prior to inclusion in a digital frame 330 of the synchronous protocol. Thus, the multipart analog message 480 is carried in digital form rather than analog form. The generation of the multipart analog message 480 is identical to that described above with respect to FIGS. 2–5, except that after the multipart analog message 480 is completely assembled, the resultant continuous analog signal is digitized, using a technique such as conventional CVSD or LPC. The digitized form of the multipart analog message 480 is then synchronously included in a digital frame 330 of the outbound synchronous protocol, as words 350 (FIG. 3). Upon reception at the selective call receiver 106, the digitized form of the multipart analog message 480 is recovered by the FM demodulator 608, decoded by the processing section 606, and stored in the analog conversion and message storage section 668. The processing section 606 then converts the digitized form of the multipart analog message 480 to decompresses analog form, separates the independent analog parts, redigitizes them into digitally sampled, uncompressed analog form, and stores the digitally sampled form in the analog conversion and message storage section 668, where it is ready to be presented as an audible message and audible responses. This second alternative embodiment has an advantage of not requiring the linear output section 624 of the receiver 602 and the linear demodulator 650 in the selective call radio 122. However, when conventional digitizing techniques are used to generate the digitized form of the multipart analog message 480, the time bandwidth product of a multipart analog message 480 is greater than when the analog form is used. This is an important factor in the choice of technology for use in the communication system. As another issue to consider, the second alternative embodiment can be contrasted with a conventional approach of sending each of the independent analog parts as a separate digital message. Additional overhead required in the conventional approach to identify each part as a part of the entire multipart analog message 480 has to be considered against the negative aspect of the added duration of the message caused by the part delimiters, and postive aspect of the simplicity of recovering the analog parts using analog techniques in accordance with the second alternative embodiment of the present invention.

It will be appreciated that there are several variations of the preferred embodiment of the present invention which may be more useful in some situations than in others. For example, an analog part delimiter 440 can be included preceding the first independent analog part, as well as preceding the others. An analog part delimiter 440 can be included at the end of the last independent analog part, instead of sending a null analog signal to fill the last analog frame 345, or instead of relying on the position identifier to indicate a ending point of the multipart analog message 480. As another example, the identification of the independent analog parts can be alternatively determined by the sequence in which they arrive within the synchronous protocol, instead of the using the code associated with the analog part delimiter 440. The use of DTMF codes has an advantage of allowing the simple use of several predetermined codes which are never sent in the multipart analog message 480, such as "yes" and "no", which have predetermined code numbers associated with them (e.g., 0 and 1). In this case, other response parts sent with the information part are then identified with DTMF code numbers greater than one. In another alternative, the selective call radio 122 has no character or number display capability, but has a less limited set of control keys. The code number of each nonpredetermined response is presented audibly to the user just before the response part audio is presented to the user. For example, an information part "How long until you can get here?" is presented, followed by: "response one, within 10 minutes; response two, 10 to 20 minutes; response three, 20 to 30 minutes." Manipulation of a user control which represents response one initiates generation of response message digitally indicating a response code of one, etc. As described above with reference to FIG. 4, the analog part delimiter 440 can alternatively be a null analog signal of predetermined duration.

It will be appreciated that the use of the analog part delimiters 440 allows a simple detection of multiple analog parts in an analog message which is transmitted within a synchronous protocol, without requiring the transmission of additional position information for each analog part, and without having to transmit the analog parts on synchronous protocol division boundaries (e.g., word boundaries). This avoids complexity in the processor section 606 of maintaining synchronism at small synchronous divisions while simultaneously performing analog recovery.

It will be further appreciated that in a selective call radio 122 such as described herein above with reference to FIG. 6, the keys in the limited set of controls typically are each assigned a primary function of control of the selective call radio 122, and do not normally select a response message. In such a selective call radio 122, predesignation of keys for predetermined responses, such as "yes" and "no" is not practical as it would otherwise be in selective call radios 122 having a less limited set of keys. With such a limited set of keys, a predetermined response message is uniquely selected in accordance with a third alternative embodiment of the present invention by manipulating a combination of the control keys. For example, a "yes" response is generated by simultaneously depressing control keys designated "next" and "alert," while a "no" response is generated by simultaneously depressing control keys designated "previous" and "alert." (In this case, the "next," "previous," and "alert" keys control, respectively, the presentation of a next stored analog message, a previous stored analog message, and switching between a normal audio alert and a vibrator alert.)

In yet another embodiment of the present invention, the predetermined responses are presented in sequence, audibly, followed by the analog response parts received in a multipart analog message 480 (if any), and one of the responses is selected for generating a response message by simultaneously depressing two of the control keys.

By now it should be appreciated that there has been provided a technique which includes and recovers a multipart analog message within a synchronous protocol. The technique permits recovery of independent analog parts of the multipart analog message using analog part delimiters 440 to identify the independent analog parts. The message generation and recovery techniques are compatible with analog recovery techniques which are used for generating and recovering the other analog information within the message, making the technique simple to incorporate in the system controller and selective call radio. A technique is also provided for generating a response message to an analog message by selecting from one or more audibly presented responses.

We claim:

1. A system controller that generates and transmits messages within a synchronous protocol of a communication system, the system controller comprising:

a message memory that stores analog messages;

a processor section, coupled to the message memory, wherein the processor section comprises a computer system and a program memory, and wherein the program memory comprises program instructions which control the computer system to sequentially assemble a plurality of independent analog parts stored in said message memory, include an analog part delimiter between each pair of successive independent analog parts which are sequentially assembled, wherein the analog part delimiters are of predetermined duration and are in sequence, and wherein the predetermined duration provides a falsing probability below a predetermined limit thereby generating a multipart analog message, include the multipart analog message at a position within the synchronous protocol, and include a digital code within the synchronous protocol which identifies the position; and a transmitter controller which couples the synchronous protocol including the multipart analog message to a radio transmitter.

2. The system controller according to claim 1, wherein the program instructions further control the computer system to generate each code in the sequence of predetermined analog codes as a dual tone multifrequency (DTMF) code.

3. The system controller according to claim 1, wherein the program instructions further control the computer system to generate a digitized form of the multipart analog message, with which the radio transmitter digitally modulates a radio signal.

4. The system controller according to claim 1, wherein the radio transmitter linearly modulates a radio signal with an analog form of the multipart analog message.

5. The system controller according to claim 1, wherein the synchronous protocol has synchronous divisions based on multiples of a synchronous clock period, and wherein the program instructions further control the computer system to include the independent analog part and analog part delimiter into the multipart analog message asynchronously with respect to the synchronous clock period.

6. A selective call radio that recovers messages received within a synchronous digital protocol of a radio signal, the selective call radio comprising:

a receiver for receiving a radio signal including a multipart analog message within a synchronous protocol;

a message memory that stores analog messages;

a sensible alert device; and a processor section, coupled to the receiver, message memory, and sensible alert device, wherein the processor section comprises a computer and a program memory, and wherein the program memory comprises program instructions which control the computer to digitally decode a digital code within the synchronous protocol which identifies a position of the multipart analog message within the synchronous protocol, recover the multipart analog message beginning at the position identified by the digital code, detect an analog part delimiter within the multipart analog message having a predetermined duration and having a part delimiter code in sequence with other part delimiter codes received in the multipart analog message, identify an independent analog part of the multipart analog message, immediately following the analog part delimiter, store the independent analog part in the message memory, and generate a sensible alert indicating that the multipart analog message is recovered.

7. The selective call radio according to claim 6, wherein the radio signal has been linearly modulated by the multipart analog message and the selective call radio further comprises a linear demodulator, coupled to said receiver and processor section, for linearly demodulating the radio signal.

8. The selective call radio according to claim 6, wherein the radio signal has been digitally modulated by a digitized form of the multipart analog message, and wherein the processor section recovers an analog form of the multipart analog message by digitally decoding the digitized form of the multipart analog message.

9. The selective call radio according to claim 6, wherein the program instructions further control the computer to decode the analog part delimiter as one of a set of predetermined dual tone multifrequency (DTMF) codes having a common predetermined duration.

10. The selective call radio according to claim 6, wherein the program instructions further control the computer to identify the independent analog part by a code of the analog part delimiter preceding the independent analog part.

11. The selective call radio according to claim 6, wherein the multipart analog message comprises a plurality of independent analog parts, and wherein one or more of the plurality of independent analog parts are response parts, and wherein the program instructions further control the computer to identify a response number of a response part by the part delimiter code of the analog part delimiter which immediately precedes the response part.

12. The selective call radio according to claim 6, wherein the synchronous protocol has synchronous divisions based on multiples of a synchronous period, and wherein the program instructions further control the computer to detect the analog part delimiter asynchronously with respect to the synchronous period.

13. The selective call radio according to claim 6, wherein the multipart analog message comprises a plurality of independent analog parts, and wherein one or more of the plurality of independent analog parts are response parts, and wherein the selective call radio further comprises:

a transmitter coupled to said processor section; and a set of control keys coupled to said processor section, and wherein the program instructions further control the computer to store the response parts in the message memory, make an audible presentation of one of the response parts, initiate generation of a response message corresponding to one of the response parts, based on a user activation of one or more of the set of control keys during a time period which includes and extends past the audible presentation by a predetermined delay period, and communicate the response to the transmitter for transmission.

14. The selective call radio according to claim 13, wherein the program instructions further control the computer to generate the response message comprising a response code which corresponds to the one of the response parts.

15. The selective call radio according to claim 13, wherein the program instructions further control the computer to generate the response message comprising text of the one of the response parts.

16. A selective call radio comprising:

a receiver section which receives a radio signal including an analog message, wherein the analog message is a multipart analog message comprising a plurality of responses;

a message memory capable of storing analog messages;

a speaker;

a set of control keys;

a processor section, coupled to the receiver section, the message memory, the speaker, and the set of control keys, wherein the processor section comprises a computer and a program memory, and wherein the program memory comprises program instructions which control the computer to:

store the analog message in the message memory, generate an audible presentation of an information part of the analog message through the speaker, followed by an audible presentation of the plurality of audible responses, and initiate generation of a response message which corresponds one of the plurality of responses, based on a user activation of a predetermined one or more of the set of control keys during a time period which includes and extends past the audible presentation of the plurality of responses by a predetermined delay period; and a transmitter which transmits the response message.

17. The selective call radio according to claim 16, wherein said processor section further comprises program instructions to:

concurrently display a number on a numeric display while a response is being presented, and wherein the user activation of the predetermined one or more of the set of control keys is used to identify the number and thereafter send the response message corresponding to the number.

18. The selective call radio according to claim 16, wherein the predetermined one or more of the set of control keys which initiate generation of the response message serve a different function when no response is being presented.

19. The selective call radio according to claim 16, wherein the set of control keys is a limited set of less than seven control keys.

* * * * *